May 27, 1952     H. R. SCHULZ ET AL     2,598,137
METHOD OF PACKAGING AND SERVING FROZEN CONFECTIONS
Filed Jan. 31, 1949
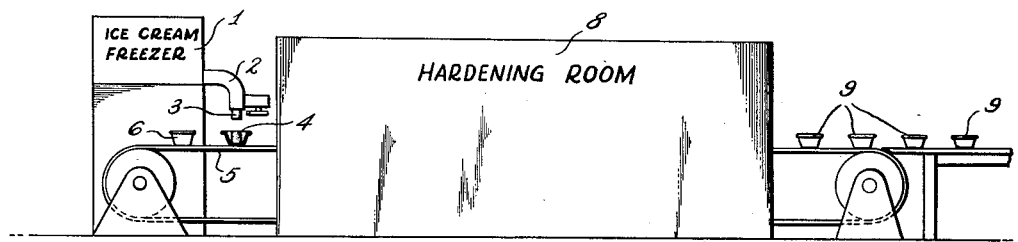
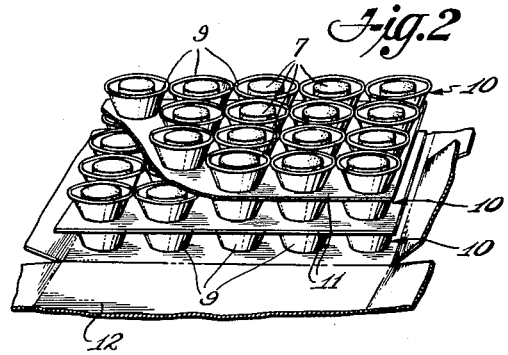
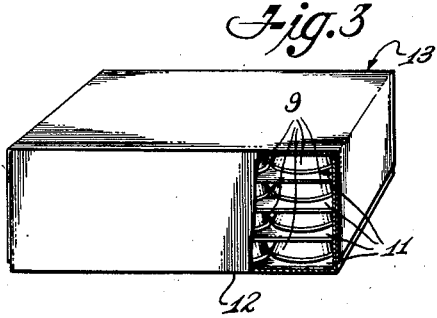
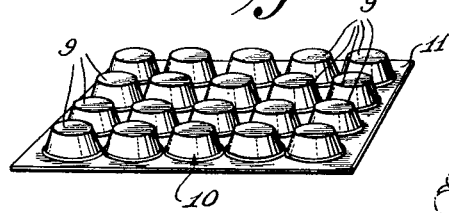
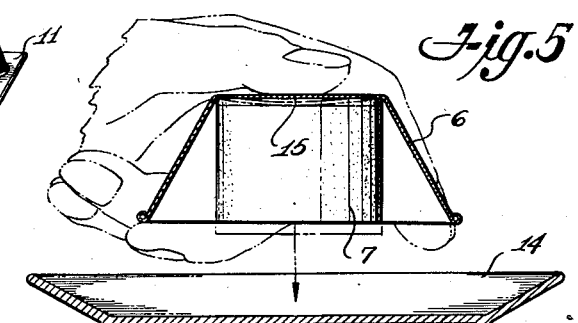
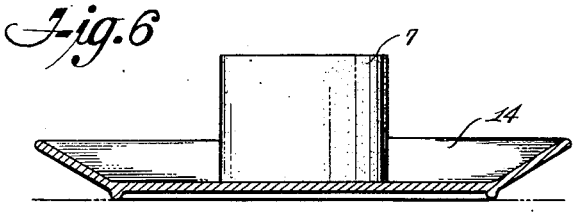
INVENTORS
HERMAN R. SCHULZ
CARL G. SCHULZ
ADAM STUART KEDZIE
By Fulwider & Mattingly
Attorneys Patented May 27, 1952

2,598,137

UNITED STATES PATENT OFFICE 2,598,137

METHOD OF PACKAGING AND SERVING FROZEN CONFECTIONS

Herman R. Schulz and Carl G. Schulz, Altadena, and Adam Stuart Kedzie, Los Angeles, Calif., assignors to Redi Products Corporation, Pasadena, Calif., a corporation of California Application January 31, 1949, Serial No. 73,782

1 Claim. (Cl. 99—180)

This invention relates to the manufacture, packaging, distribution, and serving of frozen food products such as ice cream, milk ices, sherbets, and similar frozen confections.

In practicing the present day commercial methods of manufacturing ice cream and similar frozen confections, either a batch freezer or a continuous freezer is used, into which cream, milk, flavoring and other ingredients of the final product are deposited and subjected to refrigeration and mechanical agitation to cause the mixture to freeze rapidly into a semi-frozen mass. This mass is then whipped to cause air to be occluded therein to increase the palatability of the product and to improve its texture. The aerated semi-frozen mixture is then ejected from the freezer and is deposited into cups, packages, or other receptacles, while the mixture is still in a somewhat fluid state, the product flowing by gravity or with the aid of mechanical manipulation by an operator to fill and conform with the shape of the interior of the cup or receptacle.

In order to more rapidly fill the containers, the manufacturer may stop the aeration step while the product is still quite fluid and hence proper and complete aeration is sacrificed, resulting in an inferior product. On the other hand, the manufacturer may properly aerate the mass, but then, to speed up the container filling operation, the operators, with spoons, paddles or other tools mechanically manipulate the product into place in the containers. This manipulation causes loss of a considerable amount of the aeration and further causes a breakdown of the original fine crystalline structure of the product which had resulted from the original rapid freezing thereof, and again, the most desirable texture and palatability of the product is sacrificed in favor of speed.

Furthermore, during the deposit of the material into the containers, it is exposed to the surrounding atmosphere with a consequent possibility of contamination and also the possibility of melting of the product and thus the loss of the pristine characteristics of both the crystalline structure and aeration. After the receptacles have been filled they are then transported to a hardening room where the material in the receptacles is further frozen to a hard solid mass. If the aeration has been lost or the fine crystalline structure has been lost, the refreezing of the product results in an ice cream of coarse crystalline structure and of inferior texture and palatability.

It is, therefore, the primary object of this invention to provide a method for preparing packaged ice cream and similar frozen food products in which the most desirable texture, flavor, and palatability of the product is captured as the product comes out of the freezer and is retained during the subsequent packaging, transporting, storing and serving thereof.

Another object of this invention is to provide a method whereby the freezer may be operated to produce a relatively stiff semi-frozen product in mass quantity with the most desirable characteristics of texture and aeration possible to produce in the freezer, to capture this quality by freezing the product in the freezer to such stiffness that the material, as it is ejected will retain its shape and not tend to flow by gravity, to separate the mass as it is ejected into individual shape-retaining increments, depositing such increments into individual containers to produce individual unit packages for sale or serving as unit packages, further freezing the shape-retaining increments within the containers to hard frozen consistency, transporting and storing said hard frozen unit packages at the place of individual sale or serving, and removing the increments from the containers for serving to the purchasers without allowing the increments to soften or melt beyond the shape-retaining consistency at which the product was first ejected from the freezer.

It is a further object of this invention to provide a method of making individual unit packages of ice cream or similar frozen products in which the product is ejected from the freezer as a stiff, shape-retaining mass, severing the mass as it comes out of the freezer into individual portions, depositing said portions into containers having an internal shape and size greater than the external shape and size of the portions to provide a minimum of contact area between the container and the product, and then immediately further freezing said product portion in its container to a hard frozen consistency.

A still further object of this invention is to provide a method of packaging ice cream and similar frozen products which comprises depositing predetermined sized and shaped portions of the product directly from the freezer which originally froze the product into individual containers having such shape and size as to contact only one surface of the portion, the product being frozen in the freezer to a shape-retaining consistency, then immediately further freezing the portion in the container to hard frozen consistency, and then maintaining the portion under such refrigeration as will retain the portion shape until its removal from the container for serving.

Another object of this invention is to provide a method of packaging ice cream and similar frozen products which includes the steps of making individual portion-container units as set forth in the preceding paragraph, and packaging a plurality of said units into a multi-unit package for transport and storage, and maintaining the temperature of the unit packages below the melting point of said product until said product is removed from the individual containers for serving.

Another object of this invention is to provide a method of packaging ice cream and similar frozen products wherein the product is manufactured in mass quantity in a freezer, is ejected from the freezer frozen to a shape-retaining consistency, severed into individual portions as it is ejected from the freezer, depositing the individual portions into individual open topped containers having an internal shape and size to contact only one surface of the shaped portions, further freezing the portions while in their containers to a hard frozen consistency, and serving said portions from said containers by inverting said containers and removing the portions therefrom by pressing upon the outer surface of the bottom of the container without touching the product, thus minimizing possibility of contamination from the hands of the person serving the same.

Other objects of this invention include the individual portion container unit produced by the foregoing methods, the multi-unit package so produced, and the frozen product servings so produced, together with such other objects as will more readily appear from a study of the following specification, read in connection with the accompanying drawing wherein:

Figure 1 is a diagrammatic view illustrating the steps of the method for producing the individual unit packages of frozen product in accordance with this invention;

Figure 2 is a perspective view of an assembly of a plurality of unit packages to make a multi-unit package;

Figure 3 is a perspective view of a multi-unit package ready for transportation and storage;

Figure 4 is a perspective view of a multi-unit tray of packages ready for serving;

Figure 5 is an enlarged vertical sectional view through a container and showing the manner of removing a serving of product therefrom to a serving dish; and Figure 6 is a vertical sectional view showing an individual serving of the product in a serving dish ready for serving to a customer.

Referring now to the drawings, there is illustrated in Figure 1 a diagrammatic representation of a freezer 1 which may be any of the well known types of commercial ice cream freezers, either the "batch" type or the continuous type such as are now in use in ice cream manufacturing plants wherein the various liquid ingredients, the flavoring, coloring and other materials which make up the ice cream or frozen product are deposited and subjected to refrigeration and mechanical agitation necessary to produce the desired frozen product.

However, instead of freezing the materials to the "slush" form of partial frozen but flowable consistency as is now the practice, this invention contemplates that the freezing and agitation will be continued until the product is semi-frozen to form fine ice crystals, aerated to the consistency desired in the finished product and the mass of material in the freezer being frozen to such state that the product coming from the freezer is so stiff as to be self-sustaining, that is, capable of retaining the shape into which it is molded by the exit opening of the freezer.

The product mass is preferably ejected from the freezer by any suitable ejecting means, such as augers or other mechanism capable of exerting pressure upon the product to force it out of the exit spout 2 as a columnar shaped stream 3, the lateral cross section of which is determined by the shape of the spout 2. In the form shown in the drawings, the cross section is circular, thereby permitting severing of the mass into cylindrical individual portions, as indicated at 4, by merely making lateral cuts through the stream or column.

Any suitable cutter or severing device may be used, for example, a heated blade or wire such as is shown and described in the co-pending application of Herman R. Schulz, Serial No. 72,445, filed January 24, 1949, now Patent 2,579,096, which sets forth and claims one form of ice cream manufacturing and packaging machine which may be employed to practice the methods and to produce the products described and claimed herein.

Depending upon the diameter of the column and the altitude of the cylindrical portions or increments cut therefrom, the portions or increments may be of any predetermined size or volume, such as individual servings, pints, quarts, etc., to be ready for packaging in containers, wrappers, cartons or any other type of package as may be desired. In any event, it will be appreciated that the portions or increments as cut from the column will be the frozen product in its most palatable form and of the optimum crystalline structure and aerated texture it is possible to produce in the freezer 1, and the quality of all portions will be uniform since they are cut from the mass of the product while it is of uniform quality in its exit from the freezer. In other words, the freezer operations may be so predetermined as to produce the product qualities and characteristics desired in the finished confection and by freezing the product to shape-retaining consistency before it is ejected through the spout 2, there will be no deterioration thereof as the increments are cut off ready for packaging.

To preserve these captured characteristics, the portions should be packaged immediately, without further mechanical manipulation of the product, and especially without exposure of the product to the heat of the surrounding atmosphere sufficient to melt the product before it is passed to the hardening room for final freezing into a rigid, solid consistency.

This may be readily accomplished by placing a succession of receptacles immediately below the column 3 as the successive portions are cut therefrom. Thus, each cut portion drops into its individual receptacle, container, wrapper, carton or whatever covering is to be employed to package the increments into individual portion-package units.

The particular apparatus by which the containers are presented ready to receive the cut portions is of no moment in this invention, and may be the container or receptacle feeding means described and claimed in the above noted co-pending application. As illustrated herein, it may take the form of a conveyor belt 5 disposed below the spout 2, upon which individual packaging elements 6 are placed in such spaced relation to each other and to the speed of the belt as to synchronize the location of one of the elements under a cut portion at the instant the same is cut from and falls from the column 3, or the elements 6 may be successively presented by hand below the column 3 to receive the successive cut portions as they fall.

The package elements 6 are preferably of a shape to present a plane surface below the lower flat surface of the cylindrical increment so that the increment will come to rest with the longitudinal axis of the increment supported in a vertical position and without danger of the increment indicated at 7, toppling over on its side.

As illustrated herein, the package element 6 may be one for an individual serving and may take the form of a frusto-conical paper cup of the type well known for serving individual portions of ice cream and similar products. This makes a handy package and utilizes a receptacle which is now readily available commercially. However, the size of the receptacle 6 and its shape in relation to the size and shape of the cut portion is of great importance in the practice of the invention since one of the features of this method is that the receptacles or package element receives and houses the cut portion without requiring distortion of the cut shape of the portion and hence no "flowing" of the product or manipulation thereof into the package or receptacle is required, thus permitting the retention of the "captured texture" until the product is served to the consumer.

Using cups as illustrated, it is apparent that if the base of the cups is of a diameter equal to the diameter of the cylindrical portion, the only area of contact between the product and the cup is at the cup bottom and the side walls of the cup never contact the product. Hence, later, when the product is to be removed from the package for serving, there will be no adherence between the side walls and the product, and the original shape of the cut portion is not destroyed, as is the case in present day methods of packaging wherein quantities of the product stick to the sides of the package, necessitating either the loss of the adhering material or requiring the scraping of the adhering material from the package walls when the product is served. Of course, the cup may be cylindrical and of a larger diameter base than the diameter of the cylinder and the primary consideration in the practice of this feature of this invention is that the shape and dimension of the package element 6 must be such as to avoid unnecessary wall contact or to keep the contact areas at a minimum value. As will be more fully pointed out hereinafter, the minimum area contact, especially if confined to the bottom of the receptacles, provides for a ready serving of the product without contamination thereof by the hands of the server and without mechanical manipulation by spoons, knives or other tools which might tend to impair the appearance of the product or impair the "captured texture" thereof by mechanically destroying the fine grain size or quality of aeration thereof.

The height of the cups or receptacles is not of too great importance so long as the entire portion 7 is contained within the interior of the cup and therefore, is not exposed to contact or distortion by other devices. However, as will later be apparent, the most desirable height is one equal to the length of the cut portion, since this will facilitate the later operations of storing, transporting and serving of the product.

After the cut portions are received in the cups, the portion-package unit so formed should be immediately passed into the hardening room without loss of time, danger of contamination from the atmosphere and danger of loss of the fine crystalline structure or aeration by melting before the hardening refrigeration of the product. Hence, it is an important feature of this invention to pass the portion-package units as rapidly as possible from the cutting station to the hardening room as by hand or by suitable conveyors, such as extending the conveyor belt 5 into a hardening chamber 8, the entrance of which is located as near as possible to the cutting station.

In the hardening room, the units are subjected to such refrigeration as will further freeze the product to solid, hard frozen consistency. It must be emphasized at this point that the further freezing must not be a refreezing of a partially melted product, but must be only a further freezing of a stiff shape-retaining product.

After the hardening operation, the units may be stored, transported, or otherwise handled in the same manner as present day ice cream packages. However, the unit packaging may be employed in further steps of our method to facilitate this transport, storing and ultimate serving thereof, to the customer while the pristine texture and palatability is maintained.

We have provided a novel packaging of the units into a multi-unit package as shown in Figures 2, 3 and 4, wherein a number of the units 9 are placed side-by-side to form a layer 10 and several layers may be stacked one upon the other with a cover sheet or tray 11 disposed over the tops of the cups in each layer. The cover sheet 11 may serve as a single cover for all of the units in the layer or each unit cup may have an individual cover and the sheet 11 may merely act as a separator between the layers and later act as a serving tray for the layers as shown in Figure 4.

A plurality of layers of units may be packaged together as by placing a carton or wrapper 12 about the same as shown in Figures 2 and 3, thus forming a multi-unit package 13 which can be readily stored, transported to retail outlets or kept in any suitable fashion ready for ultimate serving of the product, the multi-unit package forming a simple measure for sale and delivery to the retail stores or outlets.

When it is desired to sell and serve the product to the ultimate consumer, the multi-unit package may be opened, and a tray of units removed, it being understood that during transport and storage at the retailer's the product is kept under such refrigeration as will prevent melting.

While the unit package may be sold as a unit to the customer who may eat the contents from the cup while using the cup as a serving receptacle, the units may be served as by inverting the cups above a separate serving dish 14, as shown in Figure 5, and the server may then merely press down upon the bottom 15 of the cup 6, distorting the same and breaking the small area adhesion between the portion 7 and the cup 6. Thus, the serving takes place without the hands of the server touching the product and without requiring spoons, knives or other tools for the removal of the contents.

Needless to say, the foregoing manner of removal of the product from the cups minimizes the possibility of contamination of the product, and avoids the breakdown of texture, aeration and other qualities of the product which have been captured at the original freezer and have been maintained up to the point at which the consumer starts to eat the product.

While there is shown and described herein a preferred embodiment of the invention, it is not desired nor intended that the scope of the invention be limited thereto, except as defined in the appended claim.

We claim:

The method of preparing packaged frozen confection products comprising the steps of freezing a mass of the product to a shape-retaining consistency, extruding said mass as a column of the product, severing said extruded column into individual portions above individual packaging receptacles, each receptacle having upwardly diverging side walls and a flat bottom wall so positioned as to receive the portion with the side walls of the receptacle being spaced from the sides of the portion, the bottom wall of the receptacle being depressible, said portion being sufficiently soft to adhere to the bottom wall, immediately conveying the portion-package unit into a freezing zone to freeze the portion to hard consistency and bond the bottom of the portion to the bottom wall of the receptacle, the portion being dislodged from the receptacle by inverting the receptacle and depressing the bottom wall thereof at the time of consumption.

HERMAN R. SCHULZ.
CARL G. SCHULZ.
ADAM STUART KEDZIE.

REFERENCES CITED

The following references are of record in the file of this patent:

UNITED STATES PATENTS

| Number | Name | Date |
|---|---|---|
| 2,005,245 | Stover | June 18, 1935 |
| 2,080,920 | Ingalls | May 18, 1937 |
| 2,111,498 | Thomas et al. | Mar. 15, 1938 |
| 2,121,564 | Herron | June 21, 1938 |
| 2,150,207 | Currie | Mar. 14, 1939 |
| 2,248,651 | Von Losberg | July 8, 1941 |
| 2,435,094 | Moser | Jan. 27, 1948 |